March 29, 1960 T. H. BONN ET AL 2,931,016

DRIVE SYSTEMS FOR MAGNETIC CORE MEMORIES

Filed Sept. 28, 1955 3 Sheets-Sheet 1

INVENTORS
THEODORE H. BONN
JOSEPH D. LAWRENCE, JR.

BY Charles G. English
AGENT

INVENTORS
THEODORE H. BONN
JOSEPH D. LAWRENCE, JR.
BY Charles C. English
AGENT

DRIVE SYSTEMS FOR MAGNETIC CORE MEMORIES

Filed Sept. 28, 1955

INVENTORS
THEODORE H. BONN
JOSEPH D. LAWRENCE, JR.
BY
Charles C. English
AGENT

United States Patent Office 2,931,016

Patented Mar. 29, 1960

2,931,016

DRIVE SYSTEMS FOR MAGNETIC CORE MEMORIES

Theodore H. Bonn and Joseph D. Lawrence, Jr., Philadelphia, Pa., assignors to Sperry Rand Corporation, New York, N.Y., a corporation of Delaware Application September 28, 1955, Serial No. 537,094

15 Claims. (Cl. 340—174)

The present invention relates to switching systems and is more particularly concerned with memory arrays utilizing a plurality of magnetic cores, for instance of the type exhibiting substantially rectangular hysteresis loops, for storage purposes in conjunction with improved means for selectively driving such cores to store information therein and to selectively reproduce it therefrom at a subsequent time.

Matrices of magnetic cores are known at the present time for providing storage of information, particularly of the binary digital type. In general, such matrices include a plurality of magnetic cores capable of assuming selectively one of two predetermined significances and the information may be "written into" and/or "read out" of such core elements by preselecting substantially independent inputs uniquely coupled to a core in question. Such matrices accordingly require drive means for selectively passing currents through selected windings on core elements; and in the past, such drive systems have ordinarily taken the form of vacuum tube devices. These known forms of drive have accordingly been subject to the disadvantages that they are relatively bulky, expensive, fragible, wasteful of power, and often unreliable, giving rise to serious problems of operating failure and maintenance. Other forms of drive systems have been suggested to obviate the foregoing disadvantages, and one such alternative, in accordance with the present invention, utilizes magnetic amplifiers.

The present invention is concerned primarily with memory devices or switching systems employing unidirectional magnetic amplifiers of the series type and/or of the parallel type, for effecting drive currents to a switching matrix, and in accordance with the present invention, a given orientation of a memory line may be selectively switched by such unidirectional magnetic amplifiers to effect bidirectional current flow through a memory line in question. In accordance with various embodiments of the present invention, the foregoing bidirectional switching may be accomplished by selectively driving both ends of a memory line, or by selectively driving a single end only of such a memory line, with unidirectional magnetic amplifiers.

It is therefore an object of the present invention to provide an improved magnetic switching system.

A further object of the present invention resides in the provision of improved drive systems for memory devices.

A still further object of the preesnt invention resides in the provision of improved magnetic amplifier drive systems for use with memory devices.

Another object of the present invention resides in the provision of a drive system which may be made in smaller sizes and which is more rugged, less expensive, and less subject to operating failures than has been the case in drive systems known heretofore.

Another object of the present invention resides in the provision of improved drive systems capable of effecting selective bidirectional flow through a plurality of load devices such as magnetic core memories.

A still further object of the present invention resides in the provision of improved magnetic core memories having better operating characteristics than has been the case heretofore.

A further object of the present invention resides in the provision of an improved magnetic core memory employing magnetic amplifier drive means.

Another object of the present invention resides in the provision of drive systems for use in memory devices wherein unidirectional amplifiers may be readily isolated from one another and may provide drive of memory lines in a preselected one of two possible directions.

In accordance with the present invention, a plurality of loads, and particularly core matrices of the types generally well known in the art, may be driven selectively by magnetic amplifier devices. Such magnetic amplifier devices may in turn take the form of unidirectional series magnetic amplifiers, unidirectional parallel magnetic amplifiers, or combinations of these types; and in general, the magnetic amplifier devices so employed for drive purposes may be selectively caused to assume an output or a no-output producing state, thereby selectively to pass or to block current flow in a control line coupled to the load or memory line in question. The several memory cores or loads to be driven may be switched, in each orientation, by a matrix driven on both edges through unidirectional magnetic amplifiers of the types to be described; or in the alternative, the said memory cores or loads may be driven by selective control of unidirectional amplifier devices coupled to one edge only of memory lines, the other ends of the said memory lines being grounded, as will be described.

The drive systems of the present invention find particular utility in coincident current memories, and such memories may comprise an array of memory lines in at least two orientations, whereby a given memory core may be preselected for storage or detection of information therein. In the subsequent discussion, the drive systems to be described are concerned with the application of drive to memory lines in one orientation only, and it is to be understood that further drive means, for instance of the types to be described, may be provided for selectively providing drive in a further orientation for a given core memory.

The foregoing objects, advantages, construction and operation of the present invention will become more readily apparent from the following description and accompanying drawings, in which.

Figure 1:
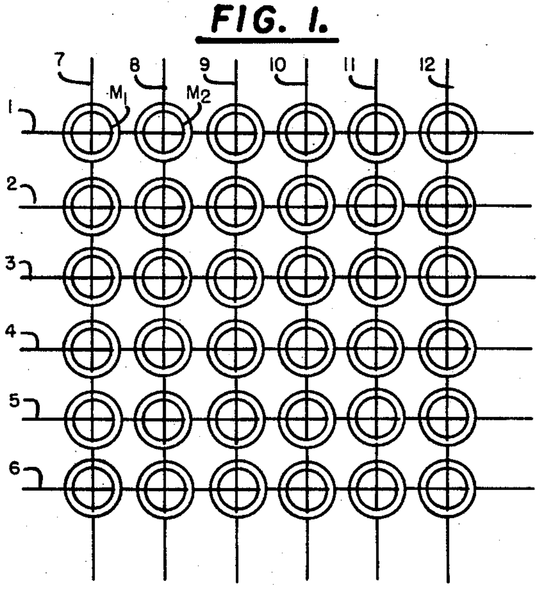
Figure 1 is a diagram illustrative of a coincident current memory, employing magnetic cores, such as may be utilized in the practice of the present invention.

Referring now to Figure 1, it will be seen that, in accordance with the present invention, a coincident current memory may comprise a plurality of horizontal drive lines 1 through 6 inclusive and a plurality of vertical drive lines 7 through 12 inclusive, in combination with a plurality of magnetic cores such as $M_1$, $M_2$, etc., disposed respectively at the intersection of a single vertical and a single horizontal drive line. In practice, a given one of the magnetic cores, such as $M_1$, $M_2$, etc., is selected for the purpose of either storing or detecting information by rendering a single vertical and a single horizontal drive line conductive. For instance, if the core $M_1$ is to be selected for operation, current would be passed through the horizontal drive line 1 and the vertical drive line 7 thereby to uniquely select core $M_1$ from the array of cores illustrated in Figure 1. The present invention deals with several methods of driving horizontal and vertical drive lines of the type illustrated in Figure 1 whereby a given memory core may be uniquely selected for operation. Inasmuch as the drive system employed must be capable of applying magnetizing forces to a selected core in either of two possible directions, such a drive system must be capable of driving currents through the memory lines in a selected one of two possible directions; and each of the following embodiments is capable of effecting such operation.

Figure 2:
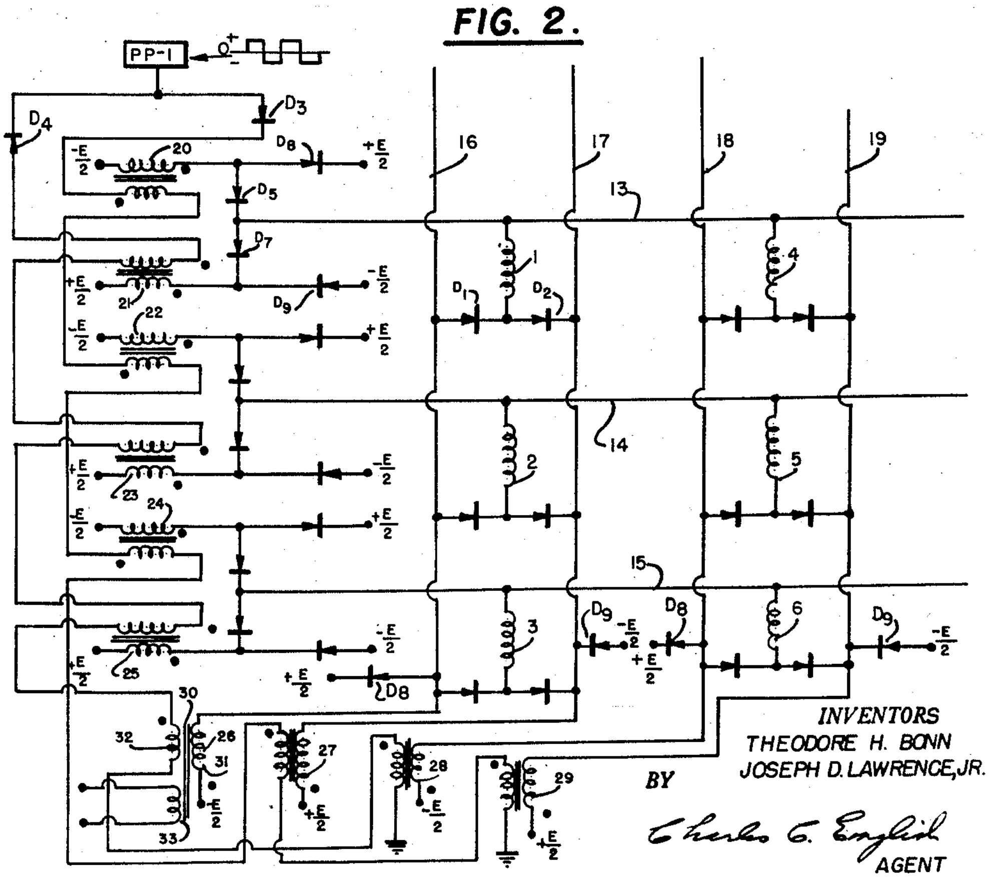
Figure 2 is a schematic diagram of one orientation of a core matrix employing a novel drive system in accordance with one embodiment of the present invention.

Referring now to Figure 2, one embodiment of the present invention has been illustrated utilizing unidirectional parallel magnetic amplifiers for effecting the above described bidirectional current flow through the several memory lines. In the particular embodiment of Figure 2, a drive system has been illustrated for memory lines 1 through 6 inclusive, and these lines are meant to be representative of the lines 1 through 6 illustrated in Figure 1. It will be appreciated from the following discussion that a similar drive system of the type illustrated in Figure 2, or in one of the other figures subsequently to be described, may similarly be employed for driving lines 7 through 12, illustrated in Figure 1, and that switching arrays as shown in Figure 2 may be contracted or expanded to drive fewer or more memory lines.

Returning now to Figure 2, it will be seen that, in accordance with the present invention, a drive system capable of bidirectionally passing currents through the memory lines 1 through 6 may comprise a plurality of horizontal drive lines 13, 14 and 15, and a plurality of vertical drive lines 16 through 19 inclusive. Each of the memory lines 1 through 6 is coupled at one of its ends to one of the horizontal drive lines 13 through 15, and is coupled at the other of its ends to a pair of vertical drive lines 16—17 and 18—19 via rectifiers such as D1 and D2.

Thus, referring to memory line 1 for instance, it will be seen that the said line 1 is coupled at its upper end to horizontal drive line 13; and is coupled at its lower end to vertical drive line 16, via rectifier D1, and to vertical drive line 17, via rectifier D2. A similar disposition will be noted for each of the other memory lines illustrated. Each of the horizontal drive lines 13—15 is coupled to a pair of parallel unidirectional magnetic amplifiers and these amplifiers have been designated 20 through 25 inclusive. Each of the vertical lines 16 through 19 is coupled, as shown, to a single unidirectional parallel magnetic amplifier 26 through 29 inclusive. By this arrangement, therefore, both ends of the several memory lines 1 through 6 are connected into a switching array which is driven on two edges by the parallel magnetic amplifiers 20 through 29 inclusive. As mentioned previously, the vertical memory lines 7 through 12 may be connected into a similar array as may memory lines of other dimensions not shown in Figure 1.

Each of the several parallel magnetic amplifiers 20 through 29 comprises a core of magnetic material, preferably exhibiting a substantially rectangular hysteresis loop, an output winding, a drive winding, and a set winding. Referring for instance to amplifier 26, it will be seen that a typical amplifier of the type employed thus utilizes a core 30, an output winding 31, a drive winding 32, and a set winding 33. For purposes of clarity, the set windings, such as 33, have not been illustrated in the other amplifiers shown in Figure 2.

In operation, the signal state at the input to an amplifier set winding, such as 33, may cause the magnetic core 30 to operate at one or the other of its remanence points. If, for instance, no signal should be applied to winding 33, the core 30 may be caused to operate at its plus remanence operating point, for instance, in which event an applied energization pulse tending to drive the said core 30 into positive saturation effects little flux change through core 30 whereby substantially no output appears across output winding 31. However, if an input signal should be applied to the winding 33, the core 30 may be caused to move to its minus remanence operating point, for instance, in which event the application of a driving pulse tending to drive the said core 30 into positive saturation effects an appreciable flux change in the core whereby a substantial output is developed by transformer action across output winding 31. In short, each of the several parallel type magnetic amplifiers illustrated in Figure 2 will produce no output in the absence of an input thereto, and will produce an output when the amplifier is set by the application of a set input thereto.

In operation, pulses of driving current are alternatively applied to amplifiers 20, 22, 24, 27, 29 and to amplifiers 21, 23, 25, 26 and 28 by a source of power pulses PP–1 exhibiting regularly occurring positive and negative going excursions of output potential. The several drive windings of the related amplifiers are connected in series, as shown, and these series connected drive windings are in turn connected to the power pulse source PP–1 by rectifiers D3 and D4, poled as shown. In order to effect a drive current through any given one of the memory lines 1 through 6, a single one of the parallel amplifiers 20 through 25 and a single one of the parallel amplifiers 26 through 29 is set during the application of a power pulse of a given polarity; whereupon the next subsequent oppositely poled power pulse from the source PP–1 drives current through the set amplifiers thereby to effect current flow through the selected memory line.

Inasmuch as each horizontal drive line 13, 14, and 15 is associated with a pair of oppositely poled magnetic amplifiers 20—21, 22—23, and 24—25, respectively, the direction of current flow in each such horizontal drive line may be selectively controlled by causing one or the other of a pair of amplifiers to assume an output producing state. Similarly, due to the opposite polarities of the rectifiers, such as D1 and D2, coupling the lower ends of each of the memory lines to the vertical drive lines, such as 16 and 17, the direction of current flow through each of the memory lines may be further controlled by selecting one or the other of the parallel magnetic amplifiers, such as 26 and 27, coupled to those vertical drive lines, for output.

In operation, it will be seen that, for instance, during the occurrence of a negative-going power pulse from the source PP–1 the rectifier D3 will be disconnected whereby no current will pass through the drive windings of any of the amplifiers 20, 22, 24, 27 and 29. During such a negative-going power pulse, therefore, one of the amplifiers 20, 22 or 24 on the vertical edge may be set and one of the amplifiers 27 or 29 on the horizontal edge of the array may be set. During the next subsequent positive-going excursion of power from the source PP–1, a current regulated pulse will pass through the drive windings of the several amplifiers coupled to rectifier D3. Only those amplifiers which have been set, however, will be caused to operate over an unsaturated portion of their hysteresis loops during the occurrence of such a drive pulse, and therefore only those set amplifiers will effect an output to the array. If, for instance, the amplifiers 20 and 27 had been set during the occurrence of a negative-going power pulse from the source PP–1, then the next subsequent positive-going excursion of power from the source PP–1 will effect an output across the output winding of amplifier 20 whereby current will flow through rectifier D5 and thence via horizontal drive line 13, memory line 1, rectifier D2, and vertical drive line 17, to the set amplifier 27. By analogy, it will be seen that by appropriately selecting one of the other parallel amplifiers on the vertical edge of the array and one of the amplifiers on the horizontal edge of the array, current may be caused to pass in a downward direction through any one of the memory lines 1 through 6 during the occurrence of such a positive-going power pulse.

During the occurrence of such a positive-going power pulse from the source PP–1, the rectifier D4 will be cut off whereby no current will pass through the drive windings of the several amplifiers 21, 23, 25, 26 and 28. During such a positive going excursion of power from the source PP–1, therefore, one of the amplifiers 21, 23, or 25 on the vertical edge of the array and one of the amplifiers 26 and 28 on the horizontal edge of the array may also be set. If, for instance, the amplifiers 21 and 26 are set during the occurrene of such a positive-going power pulse from the source PP–1, then during the next subsequent negative-going power pulse from the said power source PP–1, current will be drawn through amplifier 26 and will then pass via vertical drive line 16, rectifier D1, memory line 1, horizontal drive line 13, and rectifier D7, to the amplifier 21 on the vertical edge of the array. This current flow is in a direction opposite to that effected and described previously, and it will be seen, therefore, that by the disposition of amplifiers illustrated, selective bidirectional current may be effected through any one of the several memory lines.

Rectifiers such as D8 and D9 are coupled to the several horizontal and vertical drive amplifiers, and connected to suitable voltage levels, as illustrated, to limit the voltage levels at the outputs of windings 20—25 and to limit the voltage developed across the output windings of these amplifiers to E volts. It is necessary to so limit the voltage to E volts to prevent current flow through unselected memory lines. For example, if the voltage at the output of amplifier 20 should exceed $$\frac{+E}{2}$$

current might flow through an unselected memory line, such as 1, and through amplifier 27, inasmuch as the blocking voltage coupled to the lower end of amplifier 27 is $$\frac{+E}{2}$$

By the provision of the several potential sources, connected as illustrated, in combination with the several clamp diodes, such spurious current flow is prevented.

Figure 3:
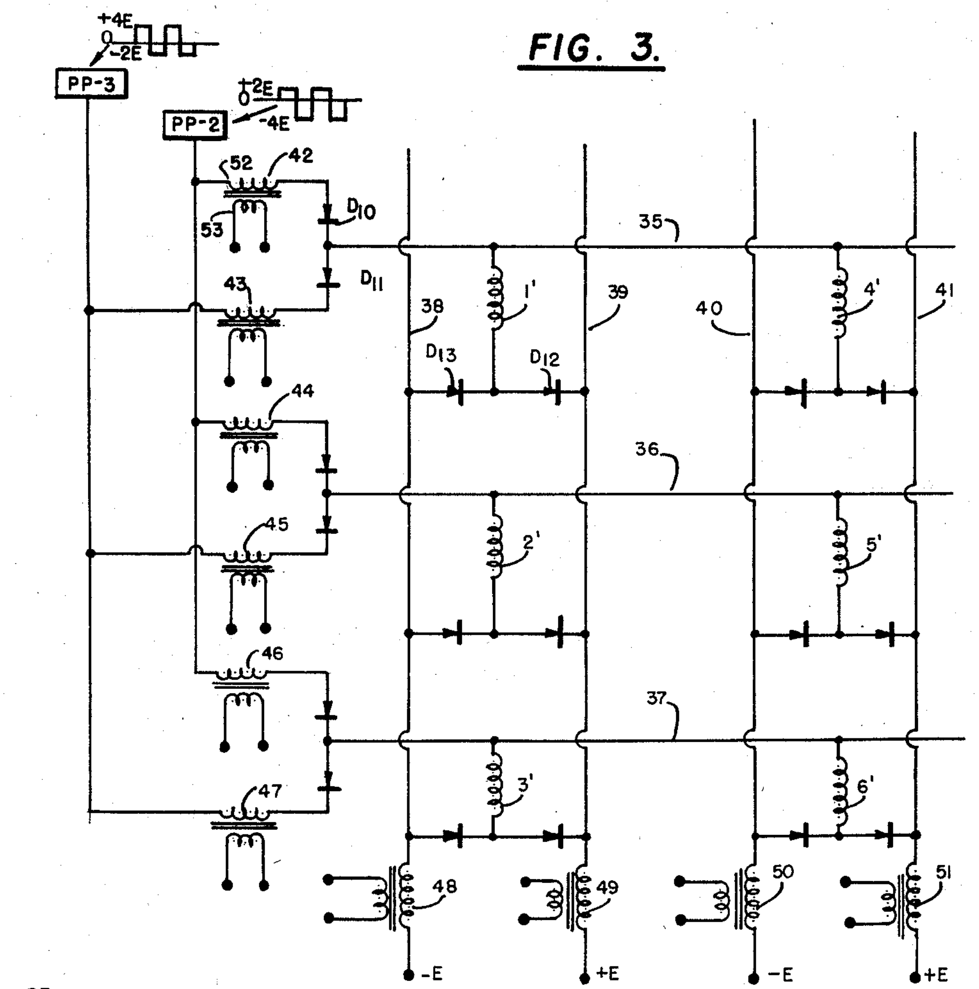
Figure 3 is a schematic representation of one orientation of a core matrix employing a novel drive system in accordance with another embodiment of the present invention.

The embodiment of the invention described in Figure 2 employs unidirectional parallel type magnetic amplifiers ("parallel" is used to denote a magnetic amplifier in which the output winding is connected in a parallel combination with the load, which combination is energized by a power source, or in which a transformer coupling exists between power source and load) on both the horizontal and vertical edges of the array. In accordance with the present invention, however, series type magnetic amplifiers ("series" is used to denote a magnetic amplifier having the power source, and output winding, and the load in a series circuit) may be employed for similar driving purposes, and one such arrangement is illustrated in Figure 3. Again, it will be seen that a switching matrix may comprise a plurality of driving lines 1′ through 6′ inclusive, coupled at one of their ends to horizontal drive lines 35, 36, 37, etc. and coupled at the other of their ends via paired rectifiers, such as D12 and D13, to vertical drive lines 38 through 41 inclusive. Each of the horizontal drive lines 35 through 37 is coupled to a pair of oppositely poled series type unidirectional magnetic amplifiers 42—43, 44—45, and 46—47, via oppositely poled rectifiers, such as D10 and D11, and each of the vertical drive lines 38 through 41 is coupled to a further series type unidirectional magnetic amplifier 48 through 51 inclusive. The several amplifiers 42, 44 and 46 are selectively driven by a source of power pulses PP–2 exhibiting the excursions shown in Figure 3 and similarly each of the amplifiers 43, 45 and 47 is driven by a source of power pulses PP–3 exhibiting the excursions illustrated in the figure.

Each of the several series amplifiers 42 through 51 comprises a core of magnetic material, preferably exhibiting a rectangular hysteresis loop; and the said core carries a drive winding such as 52 and a set winding such as 53 thereon. In operation, the drive or output windings, such as 52, may be caused to assume either a low impedance or a high impedance by causing the core of the amplifier in question to operate either on a saturated or an unsaturated portion of its hysteresis loop respectively. If, for instance, a signal should be applied to a set winding in a given magnetic amplifier, causing the core of that amplifier to operate at one of its remanence points, such as minus remanence, an applied energization pulse tending to drive the core toward the opposite magnetization, such as positive saturation, will cause the said core to operate over an unsaturated portion of its hysteresis loop whereby a relatively large flux change is effected through the output winding on that core, and the said output winding exhibits a high impedance. If, on the other hand, a given magnetic core of the series type is caused to operate, for instance, at its plus remanence operating point, an applied energization pulse tending to drive the core into positive saturation will cause the said core to operate over a saturated portion of its hysteresis loop whereby a relatively small flux change will be effected by current in the output winding and the said output winding will exhibit a relatively low impedance.

Applying the foregoing operating characteristics to the circuit shown in Figure 3, it will be seen that during a negative excursion of the sources PP–2 and PP–3, for instance, all but one of the amplifiers 42, 44 and 46, and all but one of the amplifiers 49 and 51 may be set by applying a signal input to the appropriate set windings. During the next positive-going excursion of source PP–2, all but the one unset amplifier of the group comprising 42, 44 and 46, and one only of the amplifiers 49 and 51, will be in a high impedance state and current will pass through an appropriate memory line via the single unset amplifier on the horizontal and vertical edges of the array. For example, if amplifier 42 on the vertical edge of the array and amplifier 49 on the horizontal edge of the array represent the only amplifiers unset during a previous negative-going excursion of the power pulse sources, then during a positive-going excursion of the source PP–2 current will pass from the said source PP–2 through the low impedance winding 52 and thence via rectifier D10, line 35, memory line 1′, rectifier D12, vertical line 39 and the low impedance output winding of amplifier 49 to the source +E. Current thus passes in a downward direction through the memory line 1′ and no current passes through any of the other memory lines in the array.

If, during such a positive-going excursion of PP–2, all but one of amplifiers 43, 45 and 47 and all but one of amplifiers 48 and 50 should be set, then during the next negative-going pulse from the source PP–3 one amplifier on the horizontal edge of the array and one amplifier on the vertical edge of the array will be in a low impedance state, thus permitting current to pass in an upward direction through the memory line selected. Thus, if the only unset amplifiers should be, for instance amplifiers 43 and 48, current will be caused to pass in an upward direction through line 38 and thence via rectifier D13, memory line 1′, horizontal line 35, rectifier D11 and the low impedance output winding of amplifier 43 to the source PP–3 whereby current flows in an upward direction through the memory line 1′. By analogy, it will be seen that current may be caused to pass in a similar manner through any one of the other memory lines 1′ through 6′ illustrated in Figure 3.

To summarize the foregoing, it will be seen that when series type unidirectional magnetic amplifiers are employed for drive purposes on the horizontal and vertical edges of a switching array, current may be caused to pass through a memory line in that array by setting all but one of the amplifiers of one polarity on the horizontal edge and all but one of the amplifiers of the same polarity on the vertical edge; and by appropriate selection of which amplifiers are so set and unset, current may be caused to pass through any selected memory line in either of two possible directions.

Combinations of the systems illustrated in Figures 2 and 3 may be employed whereby an array may be driven on one of its edges by parallel magnetic amplifiers and on another of its edges by series magnetic amplifiers. Thus, referring to Figure 4, it will be seen that an array may once more comprise a plurality of memory lines 1″ through 6″ inclusive, and these memory lines may be coupled at one of their ends to horizontal drive lines 55, 56 and 57 and may be coupled at the other of their ends, via paired rectifiers such as D17 and D18, to pairs of vertical lines 58—59 and 60—61. Each of the horizontal drive lines 55 through 57 may be selectively driven by a pair of oppositely poled parallel type unidirectional magnetic amplifiers 62—63, 64—65 and 66—67, and each of the vertical lines 58 through 61 may be selectively switched by a series type unidirectional magnetic amplifier 68 through 71 inclusive.

Figure 4:
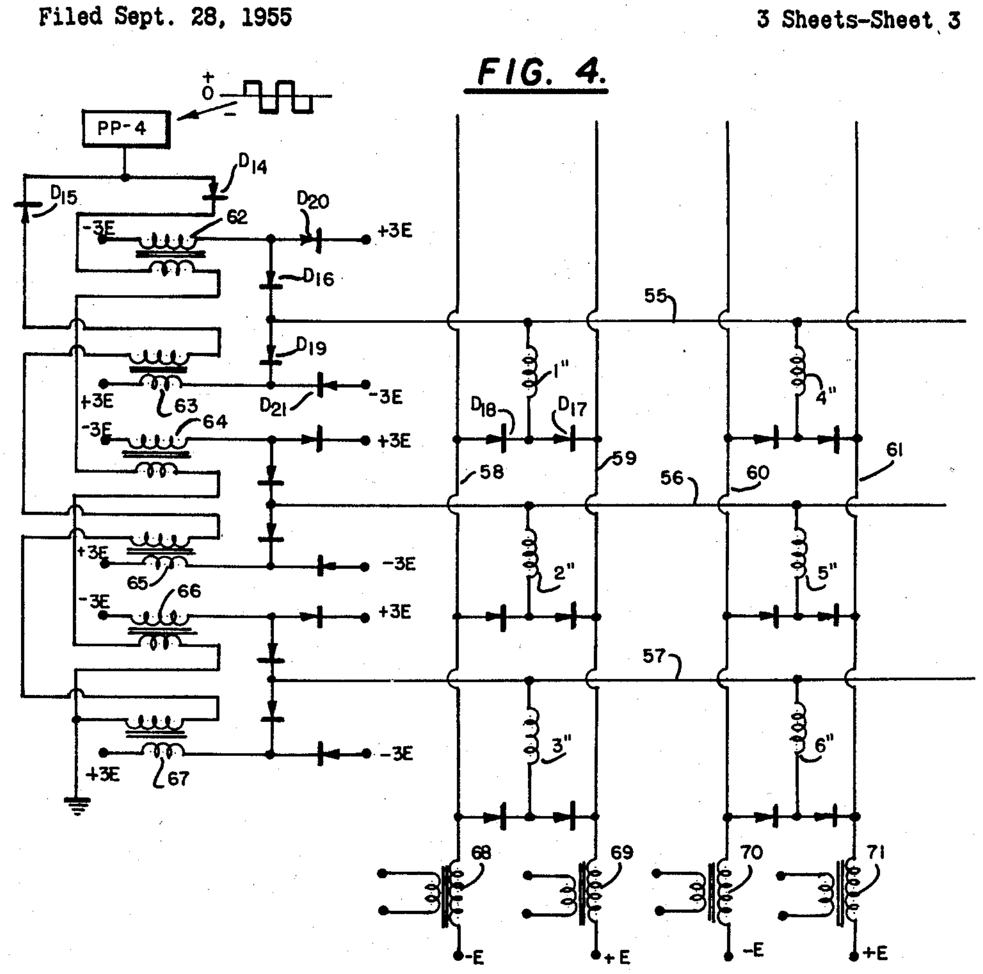
Figure 4 is a schematic representation of one orientation of a core matrix employing a novel drive system in accordance with still another embodiment of the present invention.

The operation of the several parallel type magnetic amplifiers 62 through 67 corresponds to the operation of such amplifiers as described in reference to Figure 2; and similarly, the operation of series type amplifiers 68 through 71 corresponds to the operation of such amplifiers as described in reference to Figure 3. As illustrated in Figure 4, the drive windings of parallel amplifiers 62, 64 and 66 are coupled in series with one another, and via a rectifier D14, to the source PP–4. Similarly, the drive windings of amplifiers 63, 65 and 67 are coupled in series with one another, and via a rectifier D15, to the said source PP–4. Source PP–4 exhibits regularly occurring positive and negative going excursions of output potential serving to alternately cut off one or the other of rectifiers D14 and D15, thereby to drive current into the drive windings of the amplifiers connected to the other of the rectifiers D14 and D15.

The operation of the system illustrated in Figure 4 is analogous to that described previously; and such operation is characterized by the selective setting of one of the amplifiers 62 through 67 and by the selective setting of all amplifiers but one in the group comprising series amplifiers 68 through 71 thereby to effect current flow in a predetermined direction through a single one of the memory lines 1″ through 6″. If, for instance, during a negative-going excursion of source PP–4, one of the amplifiers 62, 64 and 66 should be set, and all but one of the amplifiers 69 and 71 should be set, then during the next positive-going excursion of source PP–4 a current-regulated pulse will pass in a downward direction through one of the memory lines 1″ through 6″. By way of example, if the amplifier 62 should be set, and the amplifier 69 represents the single unset series amplifier, current will pass via rectifier D16, line 55, memory line 1″, rectifier D17, and vertical line 59, to the low impedance output winding of the amplifier 69 whereby current flows in a downward direction through memory line 1″.

Similarly, during a positive excursion of PP–4, one of the amplifiers 63, 65 and 67 may be set and all but one of the amplifiers 68 and 70 may be set whereby during the next subsequent negative-going half cycle of PP–4 current will be driven in an upward direction through a selected memory line. For instance, if the amplifier 63 should be set and the amplifier 68 is the only series amplifier unset during a positive-going excursion of PP–4, then during the next subsequent negative-going excursion of PP–4 current will pass in an upward direction through the low impedance output winding of amplifier 68 and thence via line 58, rectifier D18, memory line 1″, line 55, and rectifier D19, to the amplifier 63, whereby current is caused to pass in an upward direction through memory line 1″. Again, clamping means are provided to limit the potentials developed across the output windings of the several parallel type magnetic amplifiers and, with the various potential sources illustrated in Figure 4, rectifiers such as D20 and D21 serve to limit this potential to a value of 6E volts.

Figure 5:
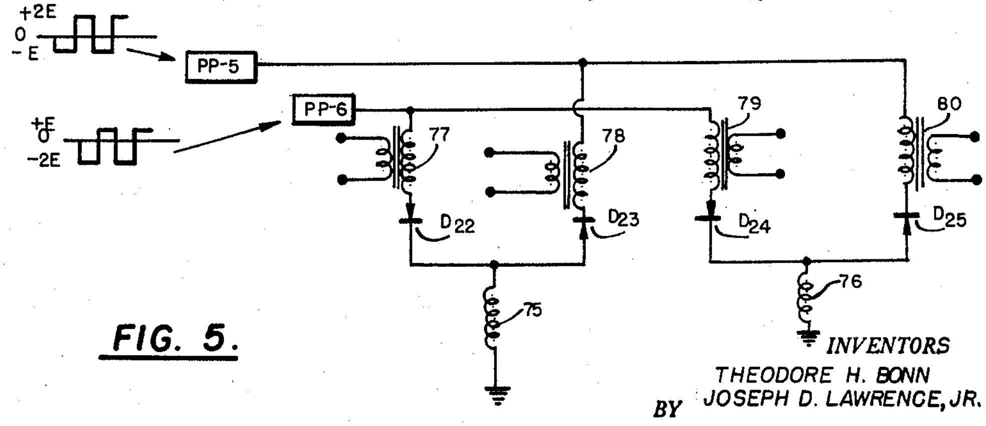
Figure 5 is a schematic representation of one orientation of a core matrix employing a novel drive system in accordance with a further embodiment of the present invention.
Figure 6:
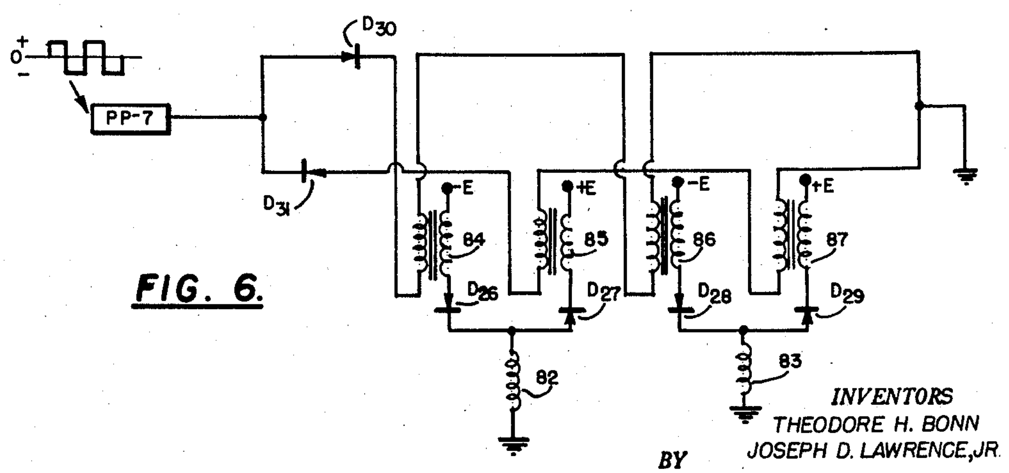
Figure 6 is a schematic representation of one orientation of a core matrix employing a novel drive system in accordance with still another embodiment of the present invention.

Each of the embodiments thus far described serves to drive a memory line bidirectionally by switching both ends of the said memory line. In accordance with further embodiments of the present invention, however, such bidirectional drive may be effected by driving a single end of the line only whereby the other end of the memory line may be grounded. Again, this modified form of drive system may employ series type magnetic amplifiers, as illustrated in Figure 5, or parallel type magnetic amplifiers as illustrated in Figure 6. Thus, referring to Figure 5, it will be seen that memory lines such as 75 and 76 may each be grounded at one of their ends and may be coupled at the other of their ends via pairs of oppositely poled rectifiers D22 and D23, and D24 and D25, and via pairs of series type unidirectional magnetic amplifiers 77—78 and 79—80, to power pulse sources PP–5 and PP–6 exhibiting regularly occurring positive and negative-going excursions, as illustrated. Amplifiers 77 and 79 serve to selectively drive current in downward directions through memory lines 75 and 76; and similarly, amplifiers 78 and 80 serve to drive current in upward directions through the said memory lines 75 and 76. The several amplifiers 77 through 80 operate in the manner already described in reference to Figure 3.

Thus, by way of example, it will be seen that during a positive excursion of PP–5 rectifiers D23 and D25 are cut off and no current passes through amplifiers 78 or 80. If, during this time all but one of the amplifiers 78 and 80 should be set, then during the next negative-going excursion of the said source PP–5 the output winding of the unset amplifier will conduct appreciable current, thereby permitting a current-regulated pulse to pass through the memory line in question. The output windings of all the set amplifiers will be in a high impedance state and will thus block the flow of current therein. During a negative-going excursion of PP–6, all but one of the amplifiers 77 and 79 may be set whereby during the next half cycle of source PP–6 the unset amplifier will conduct while the other amplifier blocks current.

In the mode of operation described above, it is necessary only to regulate the current output of sources PP–5 and PP–6 in order to have regulated current in the memory. However, in some applications, it may be desirable to drive more than one memory line at a time; and in such an application, it may be necessary to provide current-regulating means (not shown) in series with each amplifier 77 through 80 in order to have regulated currents in the selected memory lines. It should further be noted that the voltage difference of E which always exists between the sources PP–5 and PP–6 is necessary to cancel the voltages induced in the output windings of those amplifiers that are being set.

Similar operation may be effected by using parallel type magnetic amplifiers for drive purposes. Thus, referring to Figure 6 it will be seen that a pair of memory lines 82 and 83 may be coupled selectively to a source of power PP–7 via pairs of parallel type magnetic amplifiers respectively. Thus, memory line 82 is coupled via oppositely poled rectifiers D26 and D27 to the output windings of a pair of parallel magnetic amplifiers 84 and 85. Similarly, the memory line 83 is coupled via a pair of oppositely poled rectifiers D28 and D29 to the output windings of a further pair of parallel magnetic amplifiers 86 and 87. The drive windings of amplifiers 84 and 86 are connected in series between ground and the source PP–7 by a rectifier D30; and similarly, the drive windings of amplifiers 85 and 87 are connected in series with one another between ground and the said source PP–7 via a further rectifier D31, poled opposite to rectifier D30.

It will be seen, therefore, that inasmuch as source PP–7 produces regularly occurring positive and negative going output pulses of the type described previously, during a positive-going output from the said source PP–7 the rectifier D31 will be disconnected whereby no drive current is effected in amplifiers 85 or 87. If, therefore, during such a positive-going power pulse one of the amplifiers 85 or 87 should be set by applying a signal to its set winding (not shown), then, during the next subsequent negative-going half cycle of PP–7, current will be caused to flow in an upward direction through one of the memory lines 82 or 83. By way of example, if the amplifier 85 had been set, current would flow upwardly from ground through memory line 82 and thence via rectifier D27 to the output winding of amplifier 85.

It will further be seen that during a negative half cycle of the source PP–7, the rectifier D30 is disconnected whereby no drive current is coupled to amplifiers 84 or 86 and therefore during such a negative half cycle of PP–7 one or the other of amplifiers 84 or 86 may be set. If the amplifier 84 should be so set, then during the next subsequent positive-going half cycle, drive current will be coupled via rectifier D30 to the drive windings of amplifiers 84 and 86 whereby the set amplifier 84 produces an output passing current through rectifier D26 and thence through the memory line 82 in a downward direction. Even though drive current should be passed through the drive winding of amplifier 86 during this time, no output will be produced via rectifier D28 to memory line 83, inasmuch as the amplifier 86 was not set. Thus, once more, bidirectional currents may be effected through a memory line by selectively switching one or the other of a pair of unidirectional magnetic amplifiers coupled to an end of that line.

While preferred embodiments of the present invention have been described, it will be appreciated that many variations therein will be suggested to those skilled in the art. In particular, the various arrays of memory lines may be expanded or restricted to provide drive for as many lines as may be desired. For instance, while Figures 5 and 6 have illustrated drives for two memory lines only, the system may be expanded to drive a much higher plurality of lines. In addition, while the switching systems of this invention have been described with particular attention to their application in the driving of coincident-current memories, it will be appreciated that these systems can be used to drive loads other than coincident-current memories. Further variations will be suggested to those skilled in the art, and all such variations as are in accord with the principles described are meant to fall within the scope of the appended claims.

Having thus described our invention, we claim:

1. A switching system comprising a plurality of magnetic devices each including magnetic element means having substantial remanence, input winding means, and output winding means, load impedance means, separate unidirectional impedances coupling a terminal of said load impedance means to said output winding means of two of said devices, said unidirectional impedances being poled so that said load impedance means in energized in opposite directions by way of said output winding means, means for alternately applying pulses to said magnetic devices to produce pulses in said output windings at certain times in the forward directions of the respective ones of said unidirectional impedances so as to tend to energize said load impedance means in opposite directions respectively, and means for selectively energizing said input winding means at times between said certain times of application of said pulses to the respective one of said devices thereby to set the remanent states of said element means to control the production of said pulses in said output winding means and the energization of said load impedance means.

2. A switching system comprising a plurality of first and second magnetic devices each including magnetic element means having substantial remanence, input winding means, and output winding means, a plurality of load impedance means, separate unidirectional impedances coupling a terminal of each of said load impedance means to said output winding means of a different one of said first and a different one of said second devices, said unidirectional impedances being poled so that each of said load impedance means is energized in opposite directions respectively via the associated ones of said output winding means, means for alternately applying pulses to said first and second magnetic devices to produce pulses in said output windings at certain times in the forward directions of the respective ones of said unidirectional impedances so as to tend to energize the associated ones of said load impedance means in opposite directions respectively, and means for selectively energizing said input winding means at times between said certain times of application of said pulses to the respective one of said devices thereby to set the remanent states of said element means to control the production of said pulses in said output winding means and the energization of said load impedance means.

3. A switching system comprising a plurality of magnetic devices each including magnetic element means having substantial remanence, input winding means, and output winding means, magnetic information translating means including winding means, separate unidirectional impendances coupling a terminal of said information winding means to said output winding means of two of said devices, said unidirectional impedances being poled so that said information winding means is energized in opposite directions by way of said output winding means, means for applying pulses to said output windings at certain times in the forward directions of the respective ones of said unidirectional impedances so as to tend to energize said information winding means in opposite directions respectively, said pulse applying means applying oppositely directed pulses at intermediate times, means for coupling said pulse applying means to another terminal of said information winding means, and means for selectively energizing said input winding means at times between said certain times of application of said pulses to the respective one of said output winding means thereby to set the remanent states of said element means to control the passage of said pulses through said output winding means.

4. A switching system comprising a plurality of first and second magnetic devices each including magnetic element means having substantial remanence, input winding means, and output winding means, a plurality of magnetic information translating means each including winding means, separate unidirectional impedances coupling a terminal of each of said information winding means to said output winding means of a different one of said first and a different one of said second devices, said unidirectional impedances being poles so that each of said information winding means is energized in opposite directions respectively via the associated ones of said output winding means, means for alternately applying pulses to said output windings of said first and second devices at certain times in the forward directions of the respective ones of said unidirectional impedances so as to tend to energize the associated ones of said information winding means in opposite directions respectively, means for coupling said pulse applying means to another terminal of said information winding means, and means for selectively energizing said input winding means at times between said certain times of application of said pulses to the respective one of said output winding means and at the same time as the application of pulses to others of said output winding means thereby to set the remanent states of said element means to control the passage of said pulses through said output winding means.

5. A switching system as recited in claim 4 wherein said means for applying pulses to said output windings includes separate means for applying alternating pulses to said first and second device output windings with the magnitude of said pulses in the forward direction of the associated unidirectional means being less than that of the oppositely directed pulses.

6. A switching system comprising a plurality of first and second magnetic devices each including magnetic element means having substantial remanence, input winding means, and output winding means, a plurality of magnetic information translating means each including winding means, separate unidirectional impedances coupling a terminal of each of said information winding means to said output winding means of a different one of said first and a different one of said second devices, said unidirectional impedances being poled so that said information winding means is energized in opposite directions respectively via the associated ones of said output winding means, means for alternately applying pulses to said output windings of said first and second devices at certain times in the forward directions of the respective ones of said unidirectional impedances so as to tend to energize the associated ones of said information winding means in opposite directions respectively, means for coupling said pulse applying means to another terminal of said information winding means, said coupling means including additional ones of said first and second devices with said output winding means of a different one of said additional first devices and a different one of said additional second devices being connected to said other terminals of said information winding means, and means for selectively energizing said input winding means at times between said certain times of application of said pulses to the respective one of said output winding means thereby to set the remanent states of said element means to control the passage of said pulses through said output winding means.

7. In combination with a coincident-current magnetic memory including a plurality of binary magnetic information storage means each having selection winding means, a selection system therefor comprising a plurality of drive systems for providing coincident-current drive of said selection winding means, each of said drive systems comprising a plurality of first and second magnetic devices each including magnetic element means having substantial remanence, input winding means, and output winding means, separate unidirectional impedances coupling a terminal of each of a plurality of said selection winding means to said output winding means of a different one of said first and a different one of said second devices, said unidirectional impedances being poled so that each of said plurality of selection winding means is energized in opposite directions respectively via the associated ones of said output winding means, means for alternately applying pulses to said first and second magnetic devices to produce pulses in said output windings at certain times in the forward directions of the respective ones of said unidirectional impedances so as to tend to energize said selection winding means in opposite directions respectively, and means for selectively energizing said input winding means at times between said certain times of application of said pulses to the respective one of said devices thereby to set the remanent states of said element means to control the production of said pulses in said output winding means and the energization of said selection winding means.

8. In combination with a coincident-current magnetic memory including a plurality of binary magnetic information storage means each having selection winding means, a selection system therefor comprising a plurality of drive systems for providing coincident-current drive of said selection widing means, each comprising a plurality of first and second magnetic devices each including magnetic element means having substantial remanence, input winding means, and output winding means, separate unidirectional impedances coupling a terminal of each of a plurality of said selection winding means to said output winding means of a different one of said first and a different one of said second devices, said unidirectional impedances being poled so that each of said plurality of selection winding means is energized in opposite directions respectively via the associated ones of said output winding means, means for alternately applying pulses to said output windings of said first and second magnetic devices at certain times in the forward directions of the respective ones of said unidirectional impedances so as to tend to energize said selection winding means in opposite directions respectively, means for coupling said pulse applying means to another terminal of said selection winding means, and means for selectively energizing said input winding means at times between said certain times of application of said pulses to the respective one of said output winding means thereby to set the remanent states of said element means to control the production of said pulses in said output winding means and the energization of said selection winding means.

9. In combination with a coincident-current magnetic memory including a plurality of binary magnetic information storage means each having selection winding means, a selection system therefor comprising a plurality of drive systems for providing coincident-current drive of said selection winding means, each comprising a plurality of first and second magnetic devices each including magnetic element means having substantial remanence, input winding means, drive winding means and output winding means, separate unidirectional impedances coupling a terminal of each of a plurality of said selection winding means to said output winding means of a different one of said first and a different one of said second devices, said unidirectional impedances being poled so that each of said plurality of selection winding means is energized in opposite directions respectively via the associated ones of said output winding means, means for alternately applying pulses to said drive windings of said first and second magnetic devices to induce pulses in said output windings at certain times in the forward directions of the respective ones of said unidirectional impedances so as to tend to energize said selection winding means in opposite directions respectively, and means for selectively energizing said input winding means at times between said certain times of application of said pulses to the respective one of said drive winding means thereby to set the remanent states of said element means to control the production of said pulses in said output winding means and the energization of said selection winding means.

10. In combination with a coincident-current magnetic memory including a plurality of binary magnetic information storage means each having selection winding means, a selection system therefor comprising a plurality of drive systems for providing coincident-current drive of said selection winding means, each comprising a plurality of first and second magnetic devices each including magnetic element means having substantial remanence, input winding means, and output winding means, separate unidirectional impedances coupling a terminal of each of a plurality of said selection winding means to said output winding means of a different one of said first and a different one of said second devices, said unidirectional impedances being poled so that each of said plurality of selection winding means is energized in opposite directions respectively via the associated ones of said output winding means, separate means connecting other terminals of each of several groups of said selection winding means to said output winding means of additional ones of said first devices and to said output windings of additional ones of said second devices, means for alternately applying pulses to said first and second magnetic devices to produce pulses in said output windings at certain times in the forward directions of the respective ones of said unidirectional impedances so as to tend to energize said selection winding means in opposite directions respectively, and means for selectively energizing each of said input winding means at times between said certain times of application of said pulses to the respective one of said devices thereby to set the remanent states of said element means to control the production of said pulses in said output winding means and the energization of said selection winding means.

11. In combination with a plurality of binary magnetic information translating means each having selection winding means, a selection system therefor comprising a plurality of first and second control devices each including a settable element means, an input circuit, and an output circuit having a unidirectional impedance, the conductive state of each of said output circuits being determined by the condition of the associated settable element means, means for coupling a terminal of each of a plurality of said selection winding means to said output circuit of a different one of said first and a different one of said second devices, said unidirectional impedances being poled so that each of said plurality of selection winding means is energized in opposite directions respectively via the associated ones of said output circuits, means for alternately applying pulses to said output circuits of said first and second control devices at certain times in the forward directions of the respective ones of said unidirectional impedances so as to tend to energize said selection winding means in opposite directions respectively, means for coupling said pulse applying means to another terminal of said selection winding means, and means for selectively energizing said input winding means at times between said certain times of application of said pulses to the respective one of said output circuits and at the same time as the application of said pulses to said output circuits of the other numbered devices thereby to set said settable element means to control the production of said pulses in said output circuits and the energization of said selection winding means.

12. In combination with a coincident-current magnetic memory including a plurality of binary magnetic information storage means each having selection winding means, a selection system therefor comprising a plurality of drive systems for providing coincident-current drive of said selection winding means, each comprising a plurality of first and second control devices each including a settable element, an input circuit, and an output circuit having a unidirectional impedance, the conductive state of each of said output circuits being determined by the condition of the associated settable element, means for coupling a terminal of each of a plurality of said selection winding means to said output circuit of a different one of said first and a different one of said second devices, said unidirectional impedances being poled so that each of said plurality of selection winding means is energized in opposite directions respectively via the associated ones of said output circuits, means for alternately applying pulses to said output circuits of said first and second control devices at certain times in the forward directions of the respective ones of said unidirectional impedances so as to tend to energize said selection winding means in opposite directions respectively, means for coupling said pulse applying means to another terminal of said selection winding means, and means for selectively energizing said input winding means at times between said certain times of application of said pulses to the respective one of said output circuits and at the same time as the application of said pulses to said output circuits of the other numbered devices thereby to set said settable elements to control the production of said pulses in said output circuits and the energization of said selection winding means.

13. A switching system comprising a plurality of magnetic devices each including magnetic element means having substantial remanence, input winding means, and output winding means, load impedance means, separate unidirectional impedances coupling said load impedance means to said output winding means of two of said devices, said unidirectional impedances being poled so that said load impedance means is driven in opposite directions by way of said output winding means, means for alternately applying pulses to said magnetic devices to produce pulses in said output windings at certain times in the forward directions of the respective ones of said unidirectional impedances so as to tend to drive said load impedance means in opposite directions respectively, and means for selectively energizing said input winding means at times between said certain times of application of said pulses to the respective one of said devices thereby to set the remanent states of said element means to control the production of said pulses in said output winding means and the driving of said load impedance means.

14. In combination with a coincident-current magnetic memory including a plurality of binary magnetic information storage means each having selection winding means, a selection system therefore comprising a plurality of drive systems for providing coincident-current drive of said selection winding means, each of said drive systems comprising a plurality of first and second magnetic devices each including magnetic element means having substantial remanence, input winding means, and output winding means, separate unidirectional impedances coupling each of a plurality of said selection winding means to said output winding means of a different one of said first and a different one of said second devices, said unidirectional impedances being poled so that each of said plurality of selection winding means is energized to drive said magnetic storage means in opposite directions respectively via the associated ones of said output winding means, means for alternately applying pulses to said first and second magnetic devices to produce pulses in said output windings at certain times in the forward directions of the respective ones of said unidirectional impedances so as to tend to energize said selection winding means to drive said magnetic storage means in opposite directions respectively, and means for selectively energizing said input winding means at times between said certain times of application of said pulses to the respective one of said devices thereby to set the remanent states of said element means to control the production of said pulses in said output winding means and the energization of said selection winding means.

15. A switching system comprising a plurality of first and second magnetic devices each including magnetic element means having substantial remanence, input winding means, and output winding means, a plurality of load impedance means each including magnetic element means and winding means linked thereto, separate unidirectional impedances coupling each of said load impedance winding means to said output winding means of a different one of said first and a different one of said second devices, said unidirectional impedances being poled so that each of said load impedance winding means is energized to drive the associated one of said load magnetic means in opposite directions respectively via the associated ones of said output winding means, means for alternately applying pulses to said first and second magnetic devices to produce pulses in said output windings at certain times in the forward directions of the respective ones of said unidirectional impedances so as to tend to energize the associated ones of said load impedance winding means to drive said associated load magnetic means in opposite directions respectively, and means for selectively energizing said input winding means at times between said certain times of application of said pulses to the respective one of said devices thereby to set the remanent states of said element means to control the production of said pulses in said output winding means and the energization of said load impedance winding means.

References Cited in the file of this patent

UNITED STATES PATENTS

| | | |
|---|---|---|
| 2,445,455 | Rights et al. | July 20, 1948 |
| 2,734,187 | Rajchman | Feb. 7, 1956 |

OTHER REFERENCES

"Thesis on Magnetic Cores," by M. K. Haynes, published Dec. 28, 1950, pp. 21–28, 36–45.

"Magnetic Amplifier and Applications," by R. A. Ramey, published September 1953, "Electrical Engineering," pp. 791–795.

UNITED STATES PATENT OFFICE

CERTIFICATE OF CORRECTION

Patent No. 2,931,016 March 29, 1960

Theodore H. Bonn et al.

It is hereby certified that error appears in the printed specification of the above numbered patent requiring correction and that the said Letters Patent should read as corrected below.

Column 1, line 37, for "fragible" read -- fragile --; column 10, line 70, for "poles" read -- poled --; column 12, line 10, for "widing" read -- winding --; lines 16 and 17, for "diffeernt" read -- different --; column 14, line 36, for "therefore" read -- therefor --.

Signed and sealed this 11th day of October 1960.

(SEAL)
Attest:

KARL H. AXLINE
Attesting Officer

ROBERT C. WATSON
Commissioner of Patents